United States Patent
Abe et al.

(10) Patent No.: US 10,352,231 B2
(45) Date of Patent: Jul. 16, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Kazuyoshi Abe, Susono (JP); Yasushi Yoshihara, Mishima (JP); Taketo Nagasaki, Nagakute (JP); Nobuhiko Horie, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 59 days.

(21) Appl. No.: 15/504,193

(22) PCT Filed: Aug. 13, 2015

(86) PCT No.: PCT/IB2015/001321
§ 371 (c)(1),
(2) Date: Feb. 15, 2017

(87) PCT Pub. No.: WO2016/027142
PCT Pub. Date: Feb. 25, 2016

(65) Prior Publication Data
US 2017/0276060 A1     Sep. 28, 2017

(30) Foreign Application Priority Data
Aug. 18, 2014    (JP) .................................. 2014-165930

(51) Int. Cl.
*F02B 17/00*      (2006.01)
*F02B 31/04*      (2006.01)
(Continued)

(52) U.S. Cl.
CPC .............. *F02B 31/04* (2013.01); *F02B 23/10* (2013.01); *F02F 1/4235* (2013.01);
(Continued)

(58) Field of Classification Search
CPC ........ F02B 31/04; F02B 23/10; F02B 23/104; F02B 2023/106; F02F 1/4235; F02M 35/10124; Y92T 10/125; Y02T 10/146
(Continued)

(56) References Cited

U.S. PATENT DOCUMENTS 5,761,806 A    6/1998   Adachi et al.
2002/0100272 A1*   8/2002   Nishimura .......... F02D 41/3064
                                                                         60/285
(Continued)

FOREIGN PATENT DOCUMENTS

CN          1806059 A      7/2006
EP          0531541 A1     3/1993
(Continued)

*Primary Examiner* — Marguerite J McMahon
(74) *Attorney, Agent, or Firm* — Sughrue Mion, PLLC

(57) ABSTRACT

In an upstream portion from a valve connecting surface that is formed in an opening of an intake port to a combustion chamber, an upper wall surface of the intake port continues from an upstream side end of the valve connecting surface and extends substantially straight and diagonally with respect to a ceiling surface on the intake port side. In addition, a cross-sectional shape of the portion in the intake port in a direction perpendicular to an axial direction of the intake port is a flat shape with an axis in a transverse direction being a long axis.

4 Claims, 18 Drawing Sheets

(51) Int. Cl.
*F02F 1/42* (2006.01)
*F02M 35/10* (2006.01)
*F02B 23/10* (2006.01)

(52) U.S. Cl.
CPC ..... *F02M 35/10124* (2013.01); *F02B 23/104* (2013.01); *F02B 2023/106* (2013.01); *Y02T 10/125* (2013.01); *Y02T 10/146* (2013.01)

(58) Field of Classification Search
USPC ........................................................ 123/657
See application file for complete search history.

(56) References Cited

U.S. PATENT DOCUMENTS

| | | | | |
|---|---|---|---|---|
| 2002/0129785 | A1* | 9/2002 | Tetsuno | F02B 17/005 |
| | | | | 123/295 |
| 2002/0189582 | A1* | 12/2002 | Mamiya | F02D 37/02 |
| | | | | 123/295 |
| 2006/0108029 | A1 | 5/2006 | Kawasaki et al. | |
| 2006/0153996 | A1 | 7/2006 | Stanek et al. | |
| 2006/0254559 | A1* | 11/2006 | Yamaguchi | F02B 23/105 |
| | | | | 123/298 |
| 2008/0230930 | A1 | 9/2008 | Akazaki et al. | |
| 2011/0146604 | A1* | 6/2011 | Sai | F01L 1/462 |
| | | | | 123/90.66 |
| 2011/0296684 | A1* | 12/2011 | Yamamoto | B23P 13/02 |
| | | | | 29/888.06 |
| 2015/0075489 | A1* | 3/2015 | Puetzer | F02M 35/10222 |
| | | | | 123/308 |

FOREIGN PATENT DOCUMENTS

| | | |
|---|---|---|
| EP | 0 740 055 A2 | 10/1996 |
| EP | 2101055 A1 | 9/2009 |
| FR | 2924171 A1 | 5/2009 |
| JP | 04137224 U | 12/1992 |
| JP | 06101485 A | 4/1994 |
| JP | 08-074584 A | 3/1996 |
| JP | 08296416 A | 11/1996 |
| JP | 2532417 Y2 | 1/1997 |
| JP | 2002168129 A | 6/2002 |
| JP | 2003262132 A | 9/2003 |
| JP | 2004-316609 A | 11/2004 |
| JP | 2005061368 A | 3/2005 |
| JP | 2007327487 A | 12/2007 |
| JP | 2008075509 A | 4/2008 |
| JP | 4285149 B2 | 6/2009 |
| JP | 2010-207830 A | 9/2010 |
| JP | 2010-209772 A | 9/2010 |
| JP | 2010-223013 A | 10/2010 |
| JP | 2010230315 A | 10/2010 |
| KR | 1020050051740 A | 6/2005 |

\* cited by examiner

F I G . 1
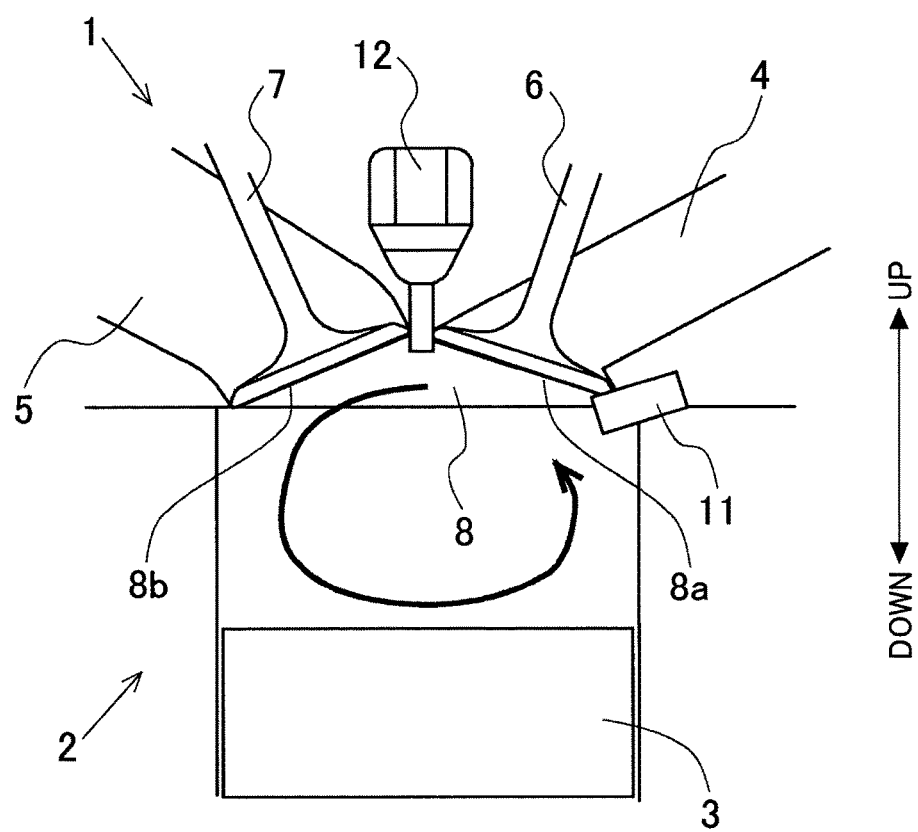

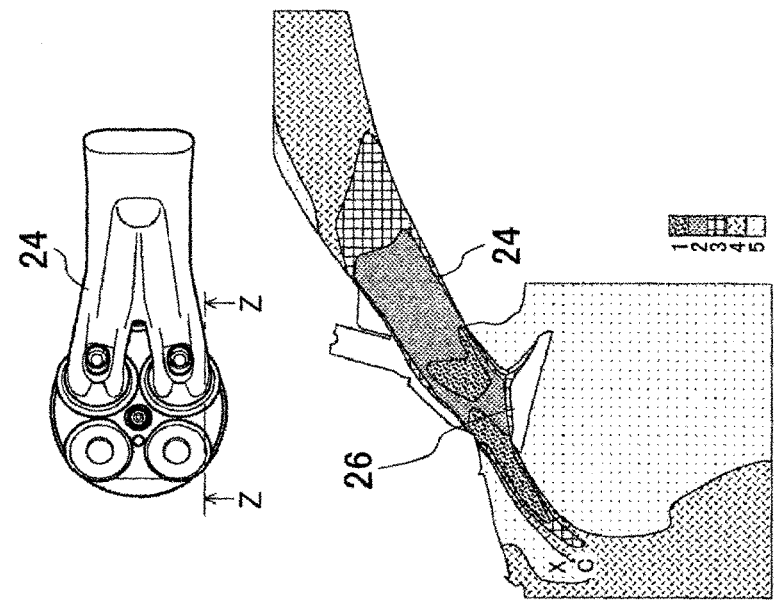
FIG. 11A [RELATED ART]
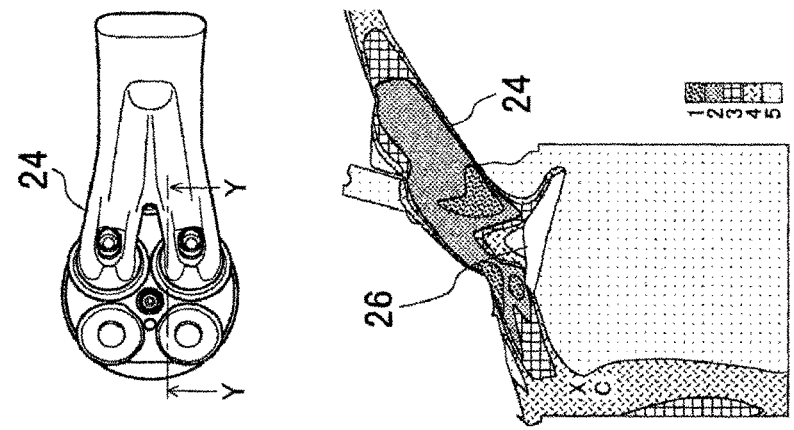
FIG. 11B [RELATED ART]
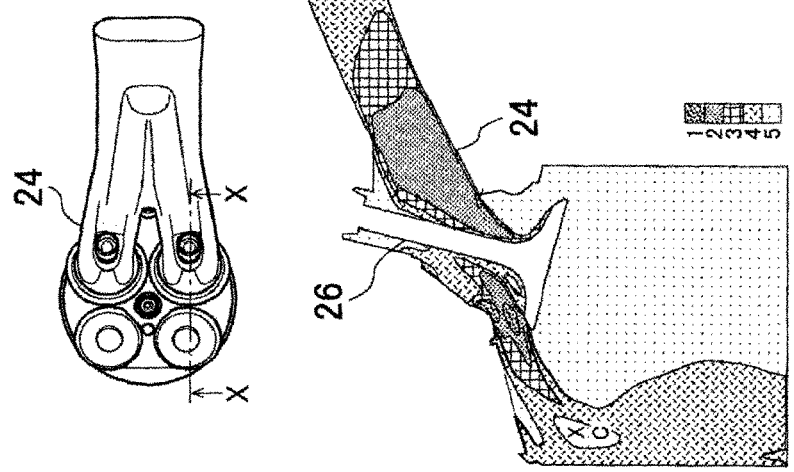
FIG. 11C [RELATED ART]

FIG. 12A 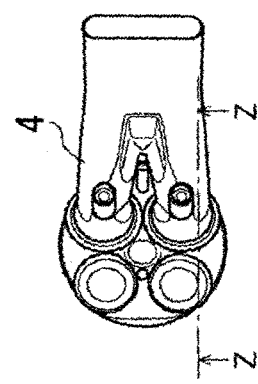 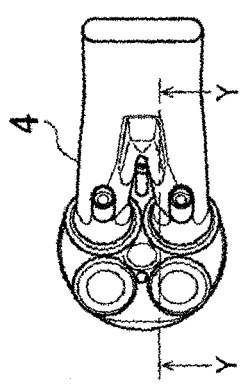 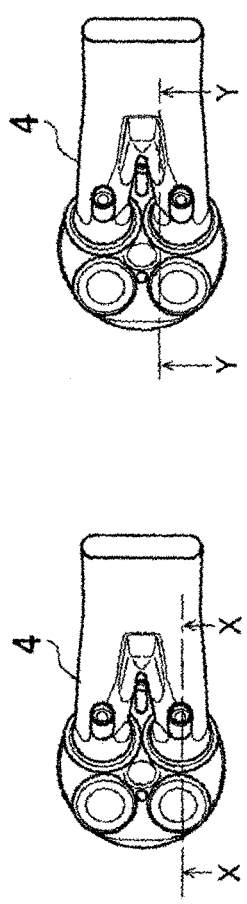
FIG. 12B
FIG. 12C
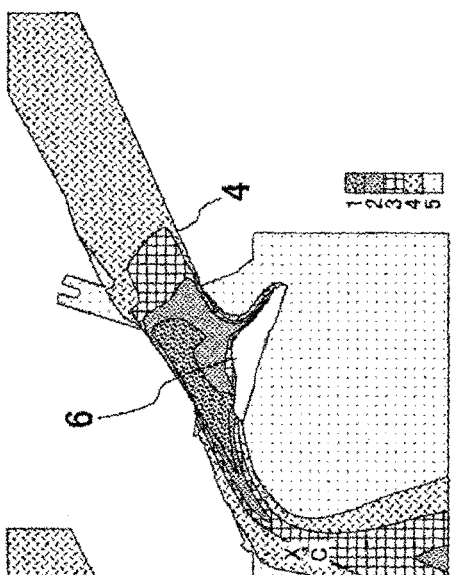
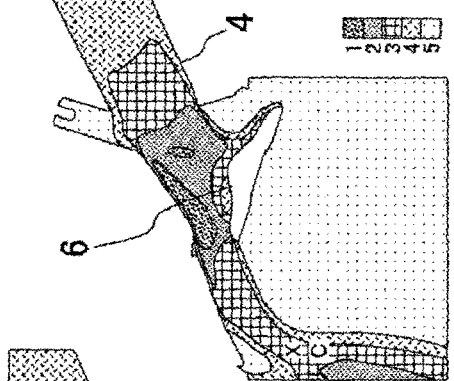
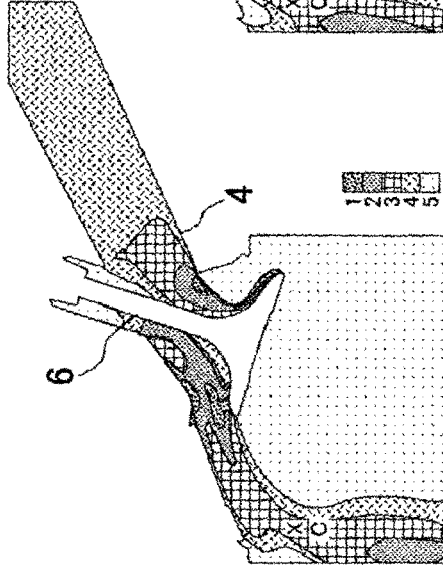

F I G . 18
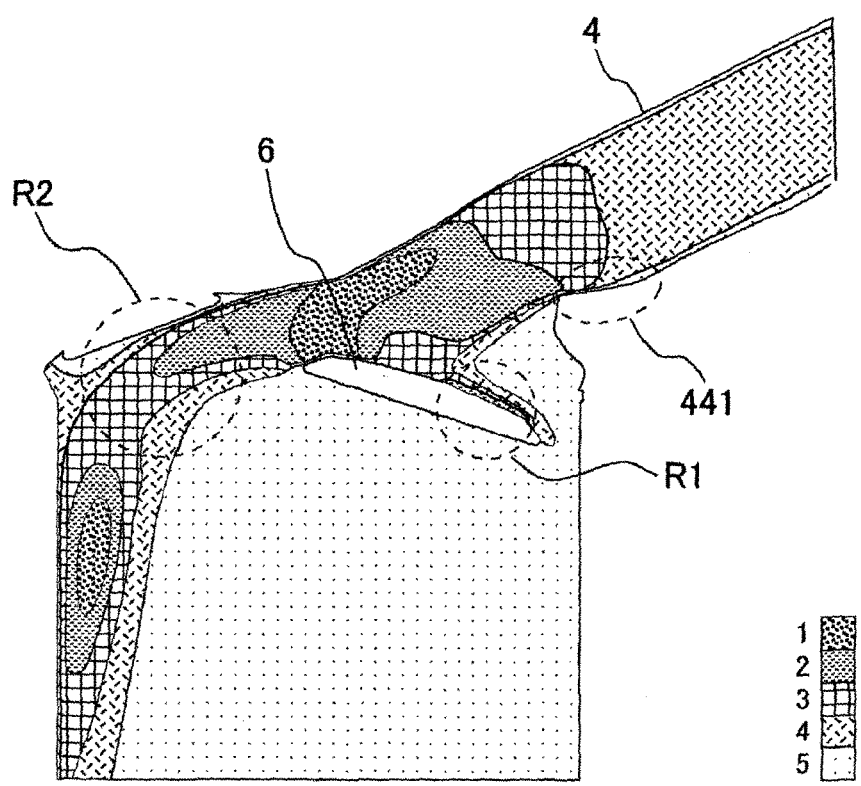

INTERNAL COMBUSTION ENGINE

BACKGROUND OF THE INVENTION

1. Field of the Invention

The invention relates to an internal combustion engine.

2. Description of Related Art

A technique for generating a swirl flow in an axial direction of a cylinder of an internal combustion engine, that is, a so-called tumble flow in the cylinder of the internal combustion engine has conventionally been known. When the tumble flow is generated in the cylinder, mixing of intake air and fuel is promoted, and consequently, combustibility in the internal combustion engine can be improved.

In addition, Japanese Patent Application Publication No. 8-74584 (JP 8-74584 A) discloses such a configuration that an intake port is formed as a straight port that extends straight and obliquely downward toward a combustion chamber from a side surface of a cylinder head while an inner diameter thereof remains the same in an internal combustion engine in which a tumble flow is generated in a cylinder. In this configuration described in JP 8-74584 A, an inner surface of an opening hole of a valve seat in the intake port that is opened to the combustion chamber is formed to have a conical surface that has a larger inner diameter than the intake port and is enlarged toward the combustion chamber. In addition, a portion of the conical surface is formed to substantially correspond to a ceiling surface of the intake port.

In Japanese Patent Application Publication No. 2004-316609 (JP 2004-316609 A), in an internal combustion engine that includes an intake port for introducing the intake air in a manner for the intake air to be biased to one side of a cylinder with respect to a center line of the cylinder, so as to generate a tumble flow in the cylinder, a configuration is disclosed in which a step projected to an inner side of the intake port is provided on a boundary between a wall surface among wall surfaces of the intake port that is on a far side from the one side and a throat of a valve seat that continues from the intake port.

In Japanese Utility Model No. 2532417, a configuration in which a cross-sectional shape of an intake port that is a linear straight port is formed as an oval shape or a substantially rectangular shape is disclosed.

SUMMARY OF THE INVENTION

In view of the above related art, the invention provides an internal combustion engine, in which a tumble flow is generated in a cylinder of the internal combustion engine, and which intensifies the tumble flow.

According to one aspect of the invention, an internal combustion engine that includes a cylinder, a piston, an intake valve, and an exhaust valve is provided. The piston is configured to reciprocate within the cylinder. The intake valve is configured to introduce or block gas from an intake port of the internal combustion engine into a combustion chamber provided in the cylinder. The exhaust valve is configured to discharge or trap the gas in the combustion chamber from the combustion chamber to an exhaust port of the internal combustion engine. Then, in the combustion chamber, a ceiling surface on the intake port side, to which the intake port is opened, and a ceiling surface on the exhaust port side, to which the exhaust port is opened, are each inclined with respect to a plane that is perpendicular to a center axis of the cylinder. The internal combustion engine is configured to generate a tumble flow by a flow of the gas in the cylinder in a direction from the ceiling surface on the exhaust port side toward a top surface of the piston near a bore wall surface provided in the cylinder on the exhaust port side and by a flow of the gas in a direction from the top surface of the piston toward the ceiling surface on the intake port side near the bore wall surface on the intake port side. In a specified region that is upstream of a valve connecting surface in the intake port, an upper wall surface of the intake port is inclined downward from a normal line direction of the ceiling surface on the intake port side with respect to the ceiling surface on the intake port side, continues from an upstream side end of the valve connecting surface, and extends substantially straight. The valve connecting surface is a surface in which an umbrella of the intake valve abuts on an opening of the intake port to the combustion chamber when the intake valve is closed. In addition, a cross-sectional shape in the specified region of the intake port that is in a direction perpendicular to an axial direction of the intake port is a flat shape with a long axis in a transverse direction, the transverse direction being defined as a direction that is perpendicular to the axial direction of the intake port and is parallel to a radial direction of the cylinder. It should be noted that, in this specification, a cylinder head side with respect to a cylinder block is defined as upward, and the cylinder block side with respect to the cylinder head is defined as downward. In addition, in this specification, a direction that is perpendicular to the axial direction of the intake port and is parallel to the radial direction of the cylinder is defined as the transverse direction. In addition, in the following description, a portion that includes an uppermost section of a wall surface of the intake port located directly above the center axis of the intake port and that is located on a relatively upper side in the wall surface of the intake port is referred to as an "upper wall surface". Furthermore, a portion that includes a lowermost section of the wall surface of the intake port located directly below the center axis of the intake port and that is located on a relatively lower side in the wall surface of the intake port is referred to as a "lower wall surface". Moreover, in the upper wall surface of the intake port, a portion that extends substantially straight as described above is referred to as a "straight portion".

When the upper wall surface of the intake port has the straight portion as described above, an intake air flow is guided by the straight portion. Thus, the intake air that has flown into the cylinder from the intake port is more likely to flow toward the exhaust port side in an upper portion of the cylinder. According to the internal combustion engine of the invention as described above, the straight portion in the upper wall surface of the intake port continuously extends from the upstream side end of the valve connecting surface that is provided in the opening of the intake port. In other words, the straight portion in the upper wall surface of the intake port extends to a position that is as close as possible to the opening of the intake port. In this way, an effect in guiding the intake air, which flows into the cylinder from the intake port, by the straight portion of the upper wall surface is further enhanced. Accordingly, the intake air that has flown into the cylinder from the intake port is more likely to flow toward the exhaust port side in the upper portion of the cylinder. Thus, a flow velocity of the intake air in a direction along the ceiling surface on the exhaust port side in the upper portion of the cylinder is further increased. Meanwhile, the cross-sectional shape in the specified region of the intake port in the direction that is perpendicular to the axial direction of the intake port is the flat shape with the axis in the transverse direction being the long axis. It should be noted that "the cross section in the direction that is perpendicular to the axial direction of the intake port" herein is a cross section that is defined by a plane including positions in the upper wall surface and the lower wall surface of the intake port that face each other in the direction perpendicular to the axial direction of the intake port. In other words, since the intake port is connected to the ceiling surface on the intake port side while being inclined downward from the normal line direction of the ceiling surface on the intake port side, "the cross section in the direction that is perpendicular to the axial direction of the intake port" does not include a cross section of a portion near the opening of the intake port, in which the lower wall surface that faces the upper wall surface in the direction perpendicular to the axial direction of the intake port is not present.

As described above, since the cross-sectional shape in the specified region of the intake port is the flat shape with the axis in the transverse direction being the long axis. Accordingly, the intake air is more likely to flow into the cylinder from an end in the transverse direction of the opening of the intake port. In addition, the intake air that has flown into the cylinder from the end in the transverse direction of the opening of the intake port is more likely to flow toward the exhaust port side in the upper portion of the cylinder. Accordingly, in a further wide range in the transverse direction of the cylinder, the intake air that has flown into the cylinder from the intake port is more likely to flow toward the exhaust port side in the upper portion of the cylinder. Thus, in the further wide range in the transverse direction of the cylinder, the flow velocity of the intake air in the direction along the ceiling surface on the exhaust port side in the upper portion of the cylinder is further increased.

As described above, according to the invention, the flow velocity of the intake air in the direction along the ceiling surface on the exhaust port side in the upper portion of the cylinder can further be increased. Thus, the tumble flow generated in the cylinder can be intensified.

In addition, in the internal combustion engine, the lower wall surface that faces the upper wall surface extending substantially straight in the specified region of the intake port may be provided with a gradient section. In the gradient section, a distance between the lower wall surface and the upper wall surface in a downstream side of flow of the gas is smaller than a distance between the lower wall surface and the upper wall surface in an upstream side of the flow of the gas such that, in a state that a length of a long axis of the cross section in the direction that is perpendicular to the axial direction of the intake port is maintained, a ratio of a length of a short axis to the length of the long axis in the cross section in the downstream side of the flow of the gas is smaller than a ratio of the length of the short axis to the length of the long axis in the cross section in the upstream side of the flow of the gas.

According to the internal combustion engine as described above, the intake air that flows near the lower wall surface in the intake port is guided by the gradient section near the opening of the intake port. Thus, when the intake air has flown into the cylinder from the intake port, the intake air is more likely to flow toward the exhaust port side in the upper portion of the cylinder. In addition, in a portion provided with the gradient section, a cross sectional area of the intake port that is in the direction perpendicular to the axial direction of the intake port (hereinafter, the cross sectional area may simply be referred to as a "cross sectional area of the intake port") is gradually decreased toward the downstream side of the flow of the gas. As a result, the flow velocity of the intake air that flows into the cylinder from the intake port is increased. Thus, according to the above configuration, the tumble flow generated in the cylinder can further be intensified.

Here, in the case where the gradient section as described above is provided in the lower wall surface of the intake port, the cross sectional area of the intake port is decreased in the portion provided with the gradient section. Thus, compared to a case where the gradient section is not provided, a flow amount of the intake air that flows into the cylinder is possibly decreased. In view of the above, in the configuration in which the gradient section as described above is provided in the lower wall surface of the intake port, an upstream side lower wall surface may be located below a virtual lower wall surface. Here, the upstream side lower wall surface is a portion of the lower wall surface in the intake port and extends upstream continuously from the gradient section. The virtual lower wall surface is a lower wall surface in a case where the lower wall surface is assumed to extend substantially straight from the upstream side end of the valve connecting surface and substantially parallel manner to the upper wall surface.

According to the internal combustion engine as described above, compared to a case where the upstream side lower wall surface in the intake port is located at the same position as the virtual lower wall surface or located above the virtual lower wall surface, the cross sectional area of the intake port in the portion provided with the gradient section can further be increased. Thus, even in the case where the gradient section is provided in the lower wall surface of the intake port, the sufficient flow amount of the intake air that flows into the cylinder can easily be secured.

In addition, in the internal combustion engine, the specified region in the intake port may be a region that is from the upstream side end of the valve connecting surface to a position at which a stem guide of the intake valve is provided. According to such an internal combustion engine, the intake air that flows into the cylinder from the intake port is guided in the direction toward the exhaust port side in the upper portion of the cylinder by the upper wall surface that is from the end of the valve connecting surface to the position at which the stem guide of the intake valve is provided.

Furthermore, in the internal combustion engine, a first inclination angle of the upper wall surface with respect to the ceiling surface on the intake port side and a second inclination angle of the valve connecting surface with respect to the ceiling surface on the intake port side may substantially be the same. The upper wall surface continues from the upstream side end of the valve connecting surface and extends substantially straight in the specified region in the intake port. According to such an internal combustion engine, the intake air in the intake port that has flown along the straight portion in the upper wall surface of the intake port is guided in the same direction by the valve connecting surface immediately before flowing into the cylinder, that is, even when passing through the valve connecting surface. According to this internal combustion engine as described above, the intake air that has flown into the cylinder from the intake port is more likely to flow smoothly in the direction toward the exhaust port side in the upper portion of the cylinder.

According to the internal combustion engine as described in the invention, the tumble flow is intensified in the internal combustion engine in which the tumble flow is generated in the cylinder of the internal combustion engine. Accordingly, mixing of the intake air and fuel for the internal combustion engine is further promoted. Thus, combustibility in the internal combustion engine can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a view of a schematic configuration of an internal combustion engine according to first and second embodiments of the invention;

FIG. 11A, FIG. 11B, FIG. 11C are views of distributions of a flow velocity of the intake air in an internal combustion engine, in which the conventional (related art) intake port shown in FIG. 7 is adopted, when the intake air has flown into the cylinder from the intake port;

FIG. 12A, FIG. 12B, FIG. 12C are views of distributions of a flow velocity of the intake air in the internal combustion engine according to the first embodiment when the intake air has flown into the cylinder from the intake port;

FIGS. 12A, 12B, 12C is plotted;

FIG. 18 is a view of the distributions of the flow velocity of the intake air in an internal combustion engine according to the second embodiment when the intake air has flown into the cylinder from the intake port.

DETAILED DESCRIPTION OF EMBODIMENTS

Figure 2:
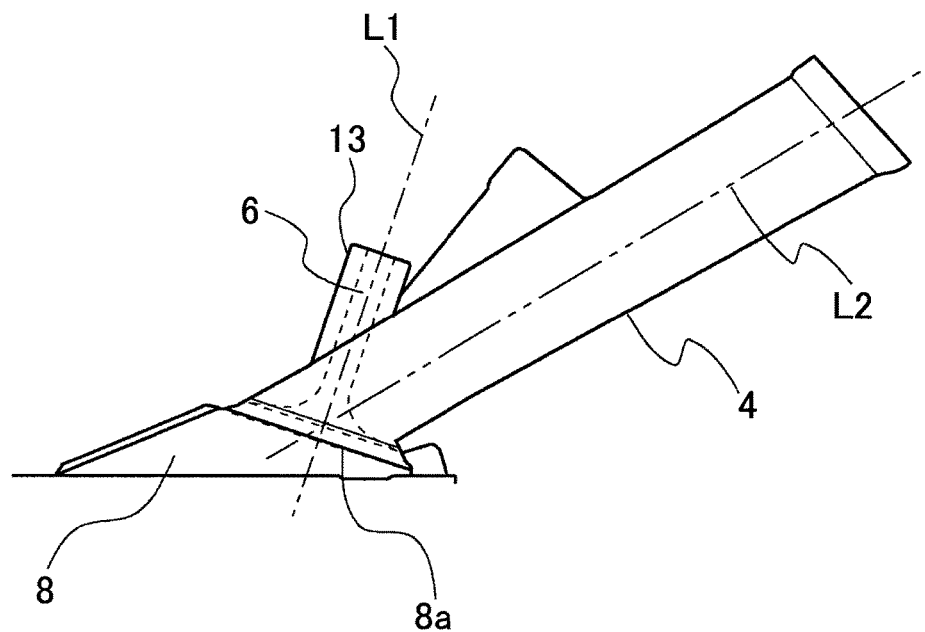
FIG. 2 is a side view of an intake port according to the first embodiment.

A description will hereinafter be made on specific embodiments of the invention on the basis of the drawings. Dimensions, materials, shapes, relative positions, and the like of components described in these embodiments are not intended to limit the technical scope of the invention to those unless otherwise noted.

A description will hereinafter be made on an internal combustion engine according to a first embodiment of the invention. FIG. 1 is a view of a schematic configuration of the internal combustion engine according to this first embodiment. An internal combustion engine 1 is a gasoline engine (an internal combustion engine of a spark ignition type) that has four cylinders 2 and is used to drive a vehicle. However, the invention is not limited to the gasoline engine but can also be applied to other types of engines. It should be noted that the only one cylinder 2 is shown in FIG. 1 as a matter of convenience.

A piston 3 is slidably provided in the cylinder 2. The piston 3 reciprocates within the cylinder 2. An intake port 4 and an exhaust port 5 that are provided in a cylinder head are connected to a combustion chamber 8 of the cylinder 2. It should be noted that two each of the intake ports 4 and the exhaust ports 5 are connected to the each cylinder 2; however, the only one intake port 4 and the only one exhaust port 5 are shown in FIG. 1 as a matter of convenience. The combustion chamber 8 is a pent-roof shaped combustion chamber in which a ceiling surface 8a on the intake port 4 side, to which the intake port 4 is opened, and a ceiling surface 8b on the exhaust port 5 side, to which the exhaust port 5 is opened, are inclined with respect a plane that is perpendicular to a center axis of the cylinder 2.

An opening of the intake port 4 to the combustion chamber 8 is opened or closed by an intake valve 6. With this opening or closing, the intake valve 6 introduces gas from the intake port 4 of the internal combustion engine 1 to the combustion chamber 8 provided in the cylinder 2 or blocks the gas. An opening of the exhaust port 5 to the combustion chamber 8 is opened or closed by an exhaust valve 7. With this opening or closing, the exhaust valve 7 discharges the gas in the combustion chamber 8 from the inside of the combustion chamber 8 to the exhaust port 5 of the internal combustion engine 1 or traps the gas. In addition, the cylinder 2 is provided with a fuel injection valve 11 for directly injecting fuel into the combustion chamber 8 and an ignition plug 12 for igniting air-fuel mixture formed in the combustion chamber 8.

An arrow in FIG. 1 indicates a gas (intake air) flow in the cylinder 2. As indicated by this arrow, in the first embodiment, in the cylinder 2, a swirl flow that swirls in an axial direction of the cylinder 2, that is, a tumble flow is generated. In the tumble flow, the gas flows in a direction toward a top surface of the piston 3 from the ceiling surface 8b on the exhaust port side near a bore wall surface on the exhaust port side, and the gas flows in a direction toward the ceiling surface 8a on the intake port side from the top surface of the piston 3 near the bore wall surface on the intake port side. Since such a tumble flow is generated, mixing of the fuel and the air is promoted, and consequently, combustibility in the internal combustion engine 1 is improved.

It should be noted that, in the following description, the cylinder head side from a cylinder block is defined to be upward, while the cylinder block side from the cylinder head is defined to be downward. In addition, a direction that is perpendicular to an axial direction of the intake port 4 and that is parallel to a radial direction of the cylinder 2 (that is, a direction in which the openings of the two intake ports 4 are aligned in the ceiling surface 8$a$ on the intake port side of the combustion chamber 8) is defined as a transverse direction.

Figure 3A:
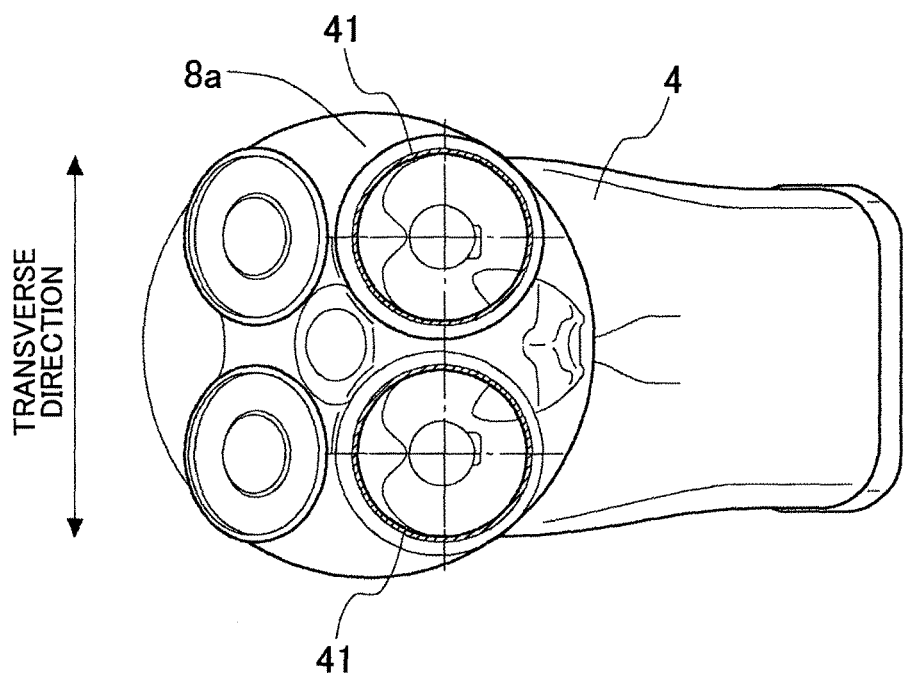
FIG. 3A and FIG. 3B are views of an opening of the intake port according to the first embodiment to a combustion chamber.
Figure 3B:
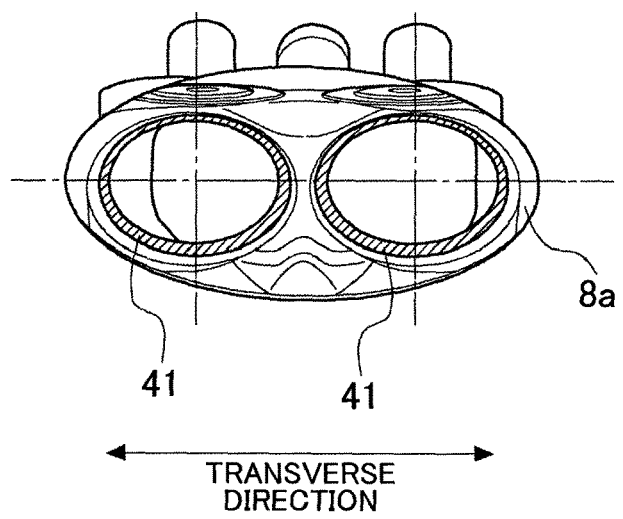
Figure 4:
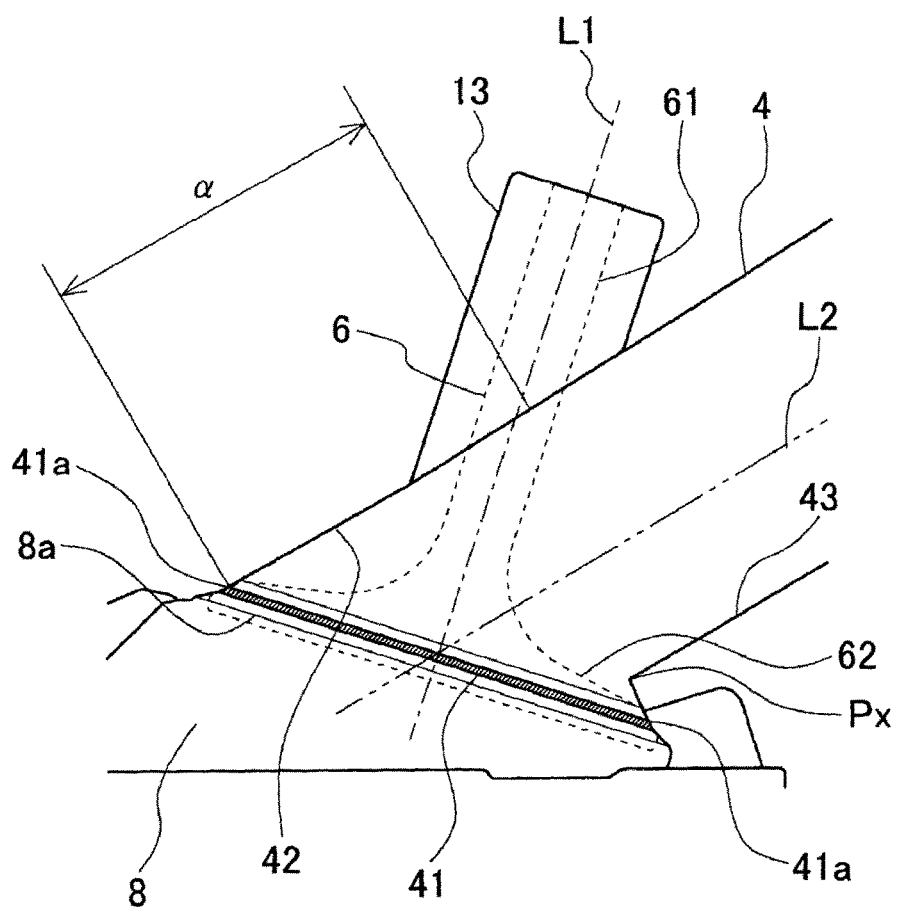
FIG. 4 is an enlarged view of a portion near the opening of the intake port according to the first embodiment.
Figure 5:
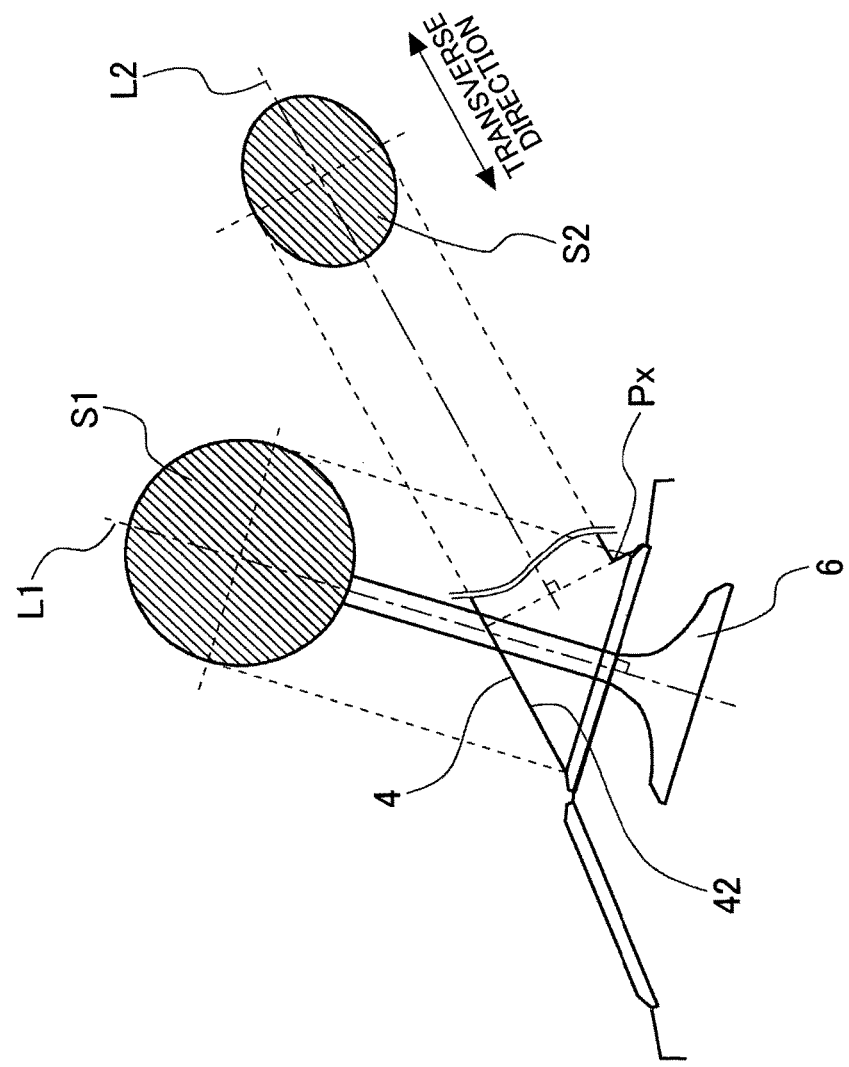
FIG. 5 is a first view of a cross-sectional shape of a valve connecting surface of the intake port and a cross-sectional shape in a direction perpendicular to an axial direction of the intake port according to the first embodiment.
Figure 6:
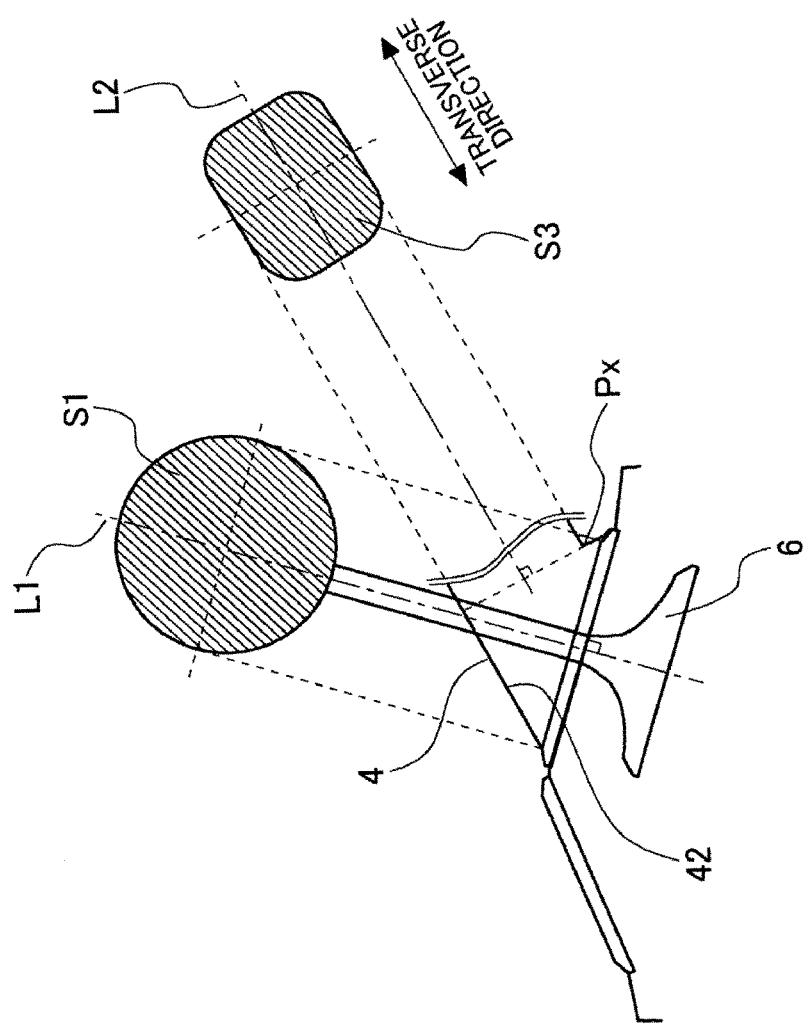
FIG. 6 is a modified example of the cross-sectional shape of the valve connecting surface of the intake port and the cross-sectional shape in the direction perpendicular to the axial direction of the intake port according to the first embodiment.

A description will hereinafter be made on a configuration of the intake port of the internal combustion engine according to this first embodiment on the basis of FIGS. 2 to 6. FIG. 2 is a side view of the intake port 4. FIGS. 3A, 3B are views of the opening of the intake port 4 to the combustion chamber 8 (hereinafter, simply referred to as the "opening of the intake port 4"). FIG. 3A is a view in which the opening of the intake port 4 is seen from below in a direction perpendicular to the ceiling surface 8$a$ on the intake port side (a direction in which a one-dot chain line L1 extends in FIG. 2). FIG. 3B is a view in which the opening of the intake port 4 is seen from below in the axial direction of the intake port 4 (a direction in which a two-dot chain line L2 extends in FIG. 2). FIG. 4 is an enlarged view of a portion near the opening of the intake port 4. FIGS. 5 and 6 are views of a cross-sectional shape of a valve connecting surface 41 of the intake port 4 and a cross-sectional shape in a direction perpendicular to the axial direction of the intake port 4. In FIGS. 5 and 6, a shaded section S1 indicates the cross-sectional shape of the valve connecting surface 41 of the intake port 4, and shaded sections S2, S3 each indicate the cross-sectional shape in the direction perpendicular to the axial direction of the intake port 4.

As shown in FIG. 2, the intake port 4 according to this first embodiment is a so-called straight port that is inclined downward from a normal line direction of the ceiling surface 8$a$ on the intake port side with respect to the ceiling surface 8$a$ on the intake port side while extending substantially straight. In addition, as shown in FIG. 3A, a shape of the opening of the intake port 4 on the ceiling surface 8$a$ on the intake port side is a substantially circular shape. Accordingly, when the opening of the intake port 4 is seen in the axial direction of the intake port 4, as shown in FIG. 3B, the shape thereof is an oval shape with an axis in the transverse direction being a long axis.

A stem guide 13 through which a stem 61 of the intake valve 6 is inserted is provided near the opening of the intake port 4. In addition, the opening of the intake port 4 is formed with the valve connecting surface 41 on which an umbrella 62 of the intake valve 6 abuts when the intake valve 6 is closed (In FIGS. 3A, 3B and FIG. 4, the shaded sections indicate the valve connecting surface). It should be noted that the valve connecting surface 41 is a surface that is defined to include a surface on which the umbrella 62 of the intake valve 6 actually abuts when the intake valve 6 is closed and is formed in an annular shape in the opening of the intake port 4. In FIG. 4, 41$a$ denotes an upstream side end of the valve connecting surface 41.

Here, a wall surface that includes an uppermost section in the wall surface of the intake port 4 located directly above a center axis of the intake port 4 and that is located on a relatively upper side in the wall surface of the intake port 4 is set as an "upper wall surface 42". In addition, a wall surface that includes a lowermost section in the wall surface of the intake port 4 located directly below the center axis of the intake port 4 and that is located on a relatively lower side in the wall surface of the intake port 4 is set as a "lower wall surface 43". In this first embodiment, as shown in FIG. 4, the upper wall surface 42 of the intake port 4 continues from the upstream side end 41$a$ of the valve connecting surface 41, and is inclined downward from the normal line direction of the ceiling surface 8$a$ on the intake port side with respect to the ceiling surface 8$a$ on the intake port side while extending substantially straight. Meanwhile, the lower wall surface 43 of the intake port 4 is formed to rise from the upstream side end 41$a$ of the valve connecting surface 41 to a specified position Px, and is inclined in an opposite direction from the exhaust port side with respect to the ceiling surface 8$a$ on the intake port side while extending substantially straight from the specified position Px in a similar manner to the upper wall surface 42.

In addition, in this first embodiment, as shown in FIG. 5, the cross-sectional shape of the intake port 4 in the direction perpendicular to the axial direction of the intake port 4 (in detail, the cross-sectional shape on an upstream side from a portion in which the lower wall surface 43 rises) is the oval shape with the axis in the transverse direction being the long axis.

It should be noted that, in this first embodiment, the cross-sectional shape of the intake port 4 in the direction perpendicular to the axial direction of the intake port 4 may not always be the oval shape but may be a flat shape with the axis in the transverse direction being the long axis. For example, as shown in the shaded section S3 in FIG. 6, the cross-sectional shape of the intake port 4 in the direction perpendicular to the axial direction of the intake port 4 may be a substantially rectangular shape (a shape in which corners of a rectangle are curved) with a side in the transverse direction being a long side. However, also in this case, the opening of the intake port 4 has the substantially circular shape on the ceiling surface 8$a$ on the intake port side. Then, as shown in FIG. 3B, the shape of the opening of the intake port 4 that is seen in the axial direction of the intake port 4 is the oval shape. Accordingly, in the case where the cross-sectional shape of the intake port 4 in the direction perpendicular to the axial direction of the intake port 4 is the substantially rectangular shape as shown in FIG. 6, it is configured that, until reaching the opening, the shape that is seen in the axial direction of the intake port 4 is gradually changed from the substantially rectangular shape to the oval shape toward the valve connecting surface 41.

Figure 7:
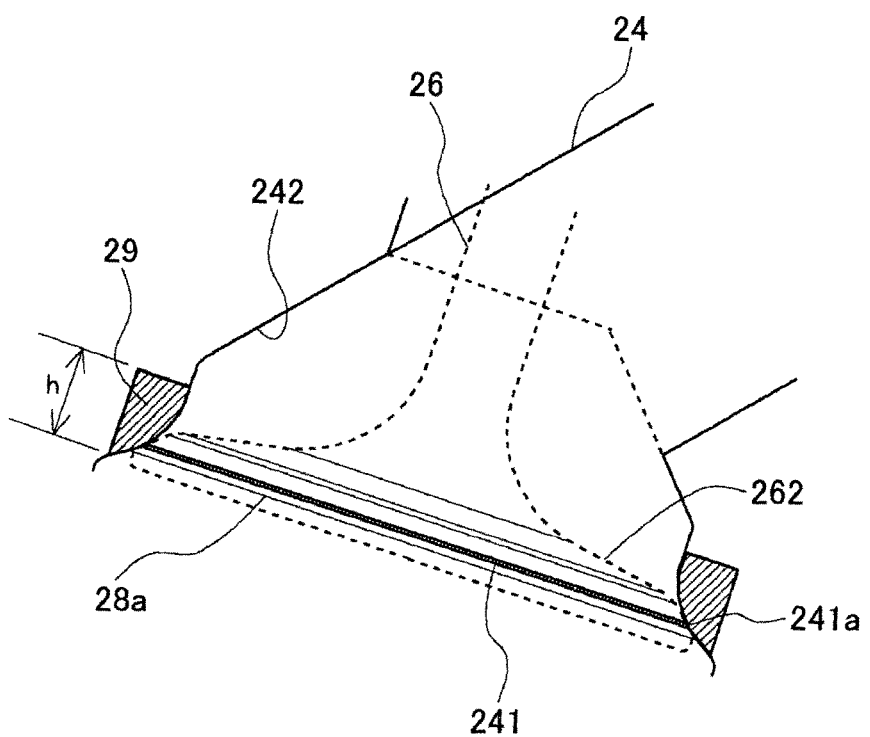
FIG. 7 is an enlarged view of a portion near an opening of a conventional (related art) intake port.

Here, a difference between the configuration of the intake port according to this first embodiment and a configuration of a conventional intake port will be described. FIG. 7 is an enlarged view of a portion near an opening in the conventional intake port. Conventionally, an annular valve seat 29 that is constructed of a member with a higher abrasion resistance property than a member for constituting a cylinder head is fitted to an opening of an intake port 24 to a combustion chamber 28. Then, a valve connecting surface 241 on which an umbrella 262 of an intake valve 26 abuts when the intake valve 26 is closed is formed on an inner peripheral surface of the valve seat 29.

In the case where such a valve seat 29 is provided, a thickness that is required to press-fit the valve seat 29 with a height h from a ceiling surface 28$a$ on the intake port side needs to be secured in the opening of the intake port 24. Accordingly, even in the case where the intake port 24 is formed as a straight port and thus an upper wall surface 242 of the intake port 24 is formed substantially straight, the upper wall surface 242 thereof is configured to extend substantially straight from a position separated from the opening of the intake port 24 by the height of the valve seat 29 or more, that is, a position at which the upper wall surface 242 rises from an upstream side end 241a of the valve connecting surface 241. In other words, a step is present between a straight portion of the upper wall surface 242 and the valve connecting surface 241.

Meanwhile, in the intake port 4 according to this first embodiment, the valve seat is not provided in the opening. Instead, a so-called laser clad valve seat, in which alloy powder is welded by a laser beam to a portion of the cylinder head formed with the opening of the intake port 4, is adopted. Since this laser clad valve seat is adopted, unlike the conventional intake port, there is no need to secure the thickness for press-fitting the valve seat from the ceiling surface on the intake port side. Accordingly, freedom in the configuration of the opening of the intake port 4 is increased. Thus, the intake port 4 according to this first embodiment can have such a configuration that the upper wall surface 42 continues from the upstream side end 41a of the valve connecting surface 41 and extends substantially straight as described above. However, in the invention, a method for realizing the configuration of the intake port is not limited to the laser clad valve seat.

Figure 8:
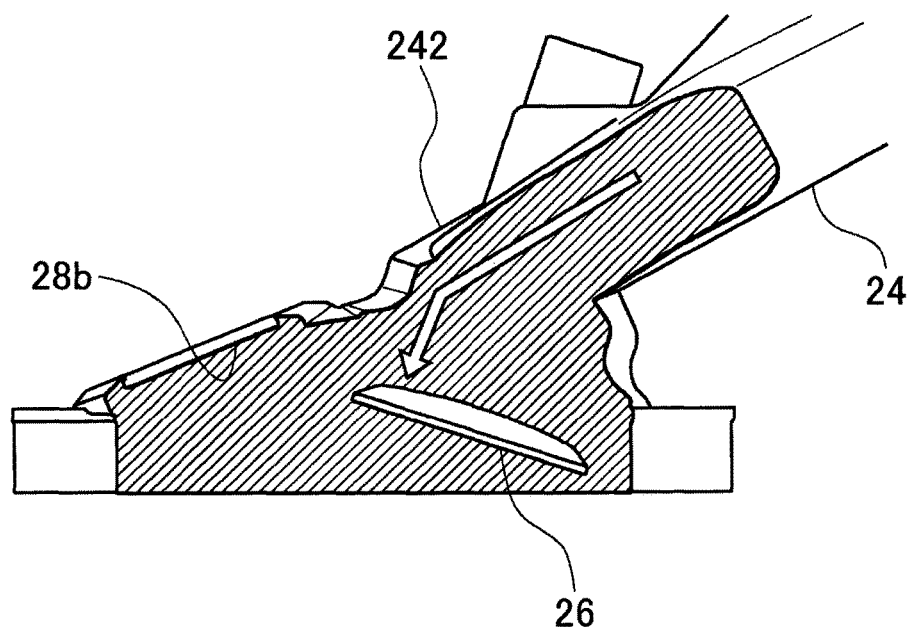
FIG. 8 is a vertical cross-sectional view of the intake port and an upper portion of a cylinder in an internal combustion engine in which the conventional (related art) intake port shown in FIG. 7 is adopted.
Figure 9:
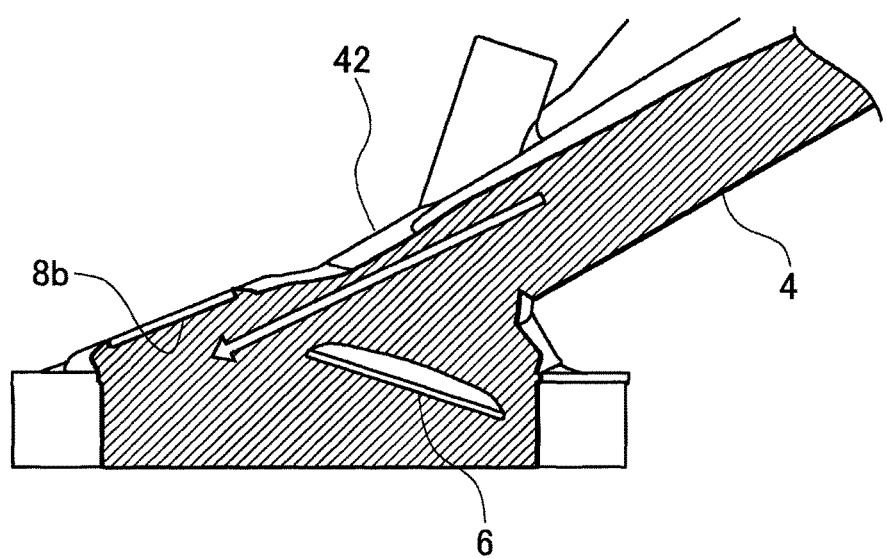
FIG. 9 is a vertical cross-sectional view of the intake port and an upper portion of a cylinder of the internal combustion engine according to the first embodiment.

Next, an effect of the configuration of the intake port according to this first embodiment will be described. FIG. 8 is a vertical cross-sectional view of the intake port and an upper portion of the cylinder of the internal combustion engine in which the conventional intake port shown in FIG. 7 is adopted. FIG. 9 is a vertical cross-sectional view of the intake port and the upper portion of the cylinder of the internal combustion engine according to this first embodiment. FIGS. 8 and 9 respectively show states that the intake valves 26, 6 are opened (FIGS. 8 and 9 each show a cross section at a position that is deviated in an outer direction of the cylinder from a plane including the center axis of the intake valve. Thus, only the umbrella of each of the intake valves 6, 26 is shown, and the stem thereof is not shown.). In addition, in each of FIGS. 8 and 9, an outlined arrow indicates an intake air flow that flows into each of the combustion chambers 8, 28 from each of the intake ports 4, 24.

As described above, the valve seat 29 is provided in the opening of the conventional intake port 24. Accordingly, the intake air that has flown along a straight portion of the upper wall surface 242 of the intake port 24 is guided by the inner peripheral surface of the valve seat 29 immediately before flowing into the cylinder. Here, a second inclination angle of the inner peripheral surface of the valve seat 29 with respect to the ceiling surface on the intake port side is larger than a first inclination angle of the straight portion of the upper wall surface 242 of the intake port 24 with respect to the ceiling surface on the intake port side. Thus, as shown in FIG. 8, the intake air flow that flows into the cylinder from the intake port 24 flows downward from a direction along the straight portion of the upper wall surface 242 of the intake port 24. In particular, compared to a position near the center axis of the intake valve, the intake air is guided further downward by the inner peripheral surface of the valve seat 29 at the position that is deviated in the outer direction from the center axis of the intake valve.

Meanwhile, as shown in FIG. 9, in the intake port 4 according to this first embodiment, the straight portion of the upper wall surface 42 extends to the end of the valve connecting surface 41. In other words, the straight portion in the upper wall surface 42 of the intake port 4 extends as close as possible to a position near the opening. Accordingly, as shown in FIG. 9, the intake air that has flown along the straight portion of the upper wall surface 42 in the intake port 4 flows into the cylinder 2 while substantially maintaining a flow direction as is. Thus, as it can be understood from the comparison with FIG. 8, the intake air that has flown into the cylinder 2 from the intake port 4 is more likely to flow in a direction along the ceiling surface 8b on the exhaust port side. In addition, also at the position that is deviated in the outer direction of the cylinder from the center axis of the intake valve, the intake air is guided by the straight portion of the upper wall surface 42 in substantially the same direction as the direction near the center axis of the intake valve. As a result, a flow velocity of the intake air in the direction along the ceiling surface 8b on the exhaust port side in an upper portion of the cylinder 2 is further increased.

Figure 10:
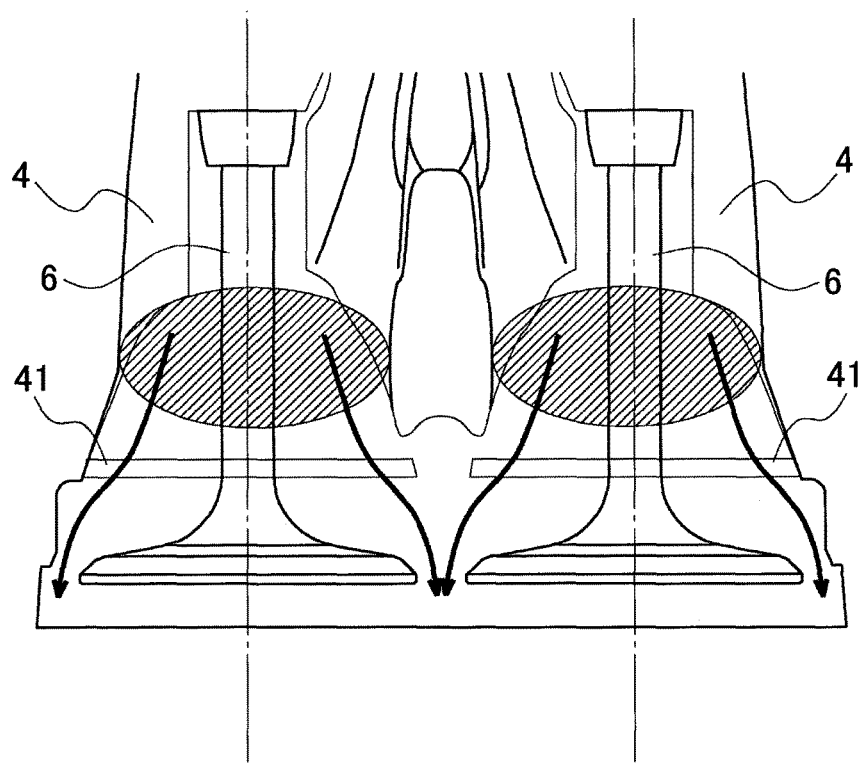
FIG. 10 is a view in which an intake air flow that flows into the cylinder from the intake port according to the first embodiment is seen from an upper side of the intake port.

FIG. 10 is a view in which the intake air flow that flows into the cylinder from the each intake port according to this first embodiment is seen from an upper side of the intake port. FIG. 10 shows a state that the each intake valve 6 is opened. In addition, in FIG. 10, each shaded section indicates a cross-sectional shape in the direction perpendicular to the axial direction of the intake port 4, and each arrow indicates the intake air flow.

As described above, in this first embodiment, the cross-sectional shape of the intake port 4 in the direction perpendicular to the axial direction of the intake port 4 is the flat shape (the oval shape in FIG. 10) with the axis in the transverse direction being the long axis. According to this configuration, as shown in FIG. 10, the intake air is also more likely to flow into the cylinder 2 from lateral sides of the opening of the intake port 4. Accordingly, the intake air is more likely to flow from the intake port 4 to a portion of the cylinder 2 near the center in the transverse direction and to a portion thereof near the bore wall surface on the lateral sides. Thus, in a further wide range in the transverse direction in the cylinder 2, the intake air that has flown into the cylinder 2 from the intake port 4 is more likely to flow in the direction along the ceiling surface 8b on the exhaust port side. As a result, in the further wide range in the transverse direction in the cylinder 2, the flow velocity of the intake air in the direction along the ceiling surface 8b on the exhaust port side in the upper portion of the cylinder 2 is further increased.

As described above, according to the configuration of the intake port according to this first embodiment, the flow velocity of the intake air in the direction along the ceiling surface 8b on the exhaust port side in the upper portion of the cylinder 2 can further be increased. In this way, the tumble flow that is generated in the cylinder 2 can be intensified.

FIGS. 11A, 11B, 11C are views of distributions of the flow velocity of the intake air in the internal combustion engine, in which the conventional intake port shown in FIG. 7 is adopted, when the intake air has flown into the cylinder from the intake port. FIGS. 12A, 12B, 12C are views of distributions of the flow velocity of the intake air in the internal combustion engine according to this first embodiment when the intake air has flown into the cylinder from the intake port. It should be noted that FIGS. 11A, 11B, 11C, and 12A, 12B, 12C show the distributions of the flow velocity of the intake air in the case where an operation state of the internal combustion engine 1 is the same. FIGS. 11A, 11B, 11C and FIGS. 12A, 12B, 12C show the distributions of the flow velocity of the intake air in the vertical cross sections of the intake port and the cylinder at different positions from each other in the transverse direction. In addition, in each of FIGS. 11A, 11B, 11C and FIGS. 12A, 12B, 12C, positions in the vertical cross section of the intake port and the cylinder are shown in an upper area, and the distributions of the flow velocity of the intake air in the vertical cross section shown in the upper area are shown in a lower area. In detail, the lower areas of FIG. 11A and FIG. 12A each show the distributions of the flow velocity of the intake air in an X-X cross section shown in the upper area thereof (a cross section by a plane including the center axis of the intake valve, hereinafter referred to as a valve center cross section). The lower areas of FIG. 11B and FIG. 12B each show the distributions of the flow velocity of the intake air in a Y-Y cross section shown in the upper area thereof (a cross section by a plane that is located in a center direction of the cylinder from the valve center cross section, hereinafter referred to as a bore center side cross section). The lower areas of FIG. 11C and FIG. 12C each show the distributions of the flow velocity of the intake air in a Z-Z cross section shown in the upper area thereof (a cross section by a plane that is located in the outer direction of the cylinder from the valve center cross section, hereinafter referred to as a bore wall surface side cross section). In the lower area of each of FIGS. 11A, 11B, 11C and FIGS. 12A, 12B, 12C, the distributions of the flow velocity of the intake air are represented by patterns 1 to 5, and the flow velocity of the intake air decreases in an order from the pattern 1 to the pattern 5 (that is, the flow velocity is the highest at a position indicated by the pattern 1, and the flow velocity is the lowest at a position indicated by the pattern 5).

Figure 13:
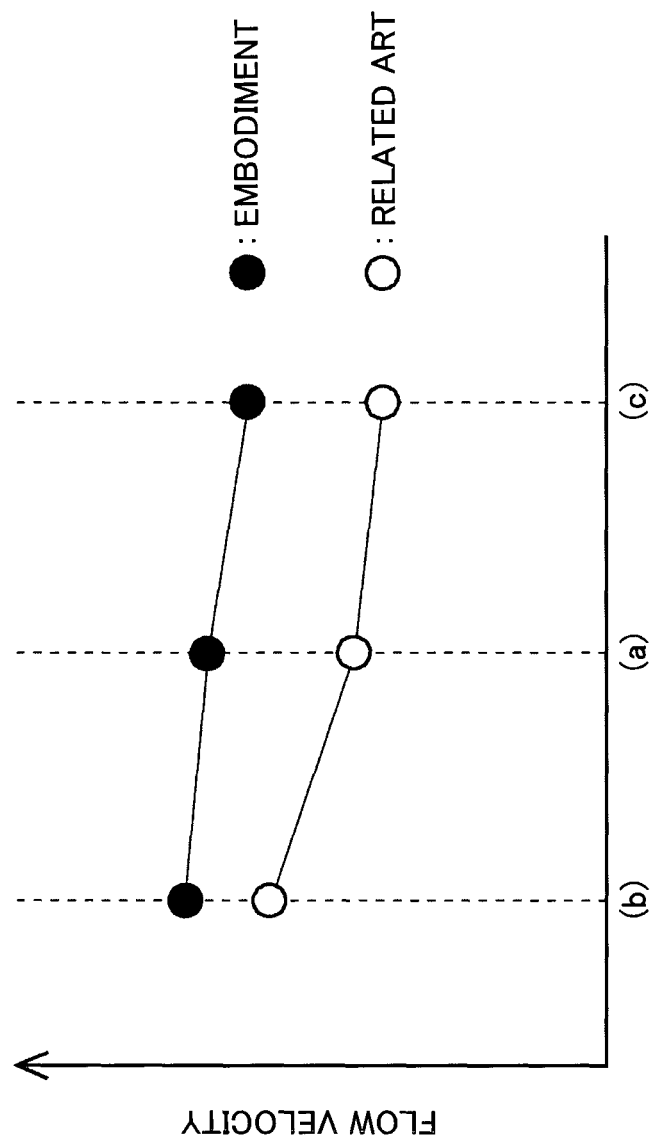
FIG. 13 is a graph in which the flow velocity of the intake air at a position indicated by a point C in a lower area of each of FIGS. 11A, 11B, 11C

In addition, FIG. 13 is a graph in which the flow velocity of the intake air at a position indicated by a point C in the lower area of each of FIGS. 11A, 11B, 11C and FIGS. 12A, 12B, 12C is plotted. The point C indicates a position in the cylinder at which a direction of the intake air flow is shifted from the direction along the ceiling surface on the exhaust port side to a direction along the bore wall surface on the exhaust port side (a direction from the ceiling surface on the exhaust port side toward the top surface of the piston). It is anticipated that the tumble flow is intensified as the flow velocity of the intake air at the position indicated by this point C is increased. In FIG. 13, a horizontal axis indicates measured positions of the flow velocity of the intake air in the transverse direction in the cylinder, and (a), (b), and (c) of the horizontal axis respectively correspond to FIGS. 11A, 11B, 11C and FIGS. 12A, 12B, 12C. In FIG. 13, a vertical axis indicates the flow velocity of the intake air. Also, in FIG. 13, each white circle indicates the flow velocity of the intake air at the position indicated by the point C in the lower area of each of FIGS. 11A, 11B, 11C, that is, the flow velocity of the intake air in the internal combustion engine in which the conventional intake port is adopted. Each black circle indicates the flow velocity of the intake air at the position indicated by the point C in the lower area of each of FIGS. 12A, 12B, 12C, that is, the flow velocity of the intake air in the internal combustion engine according to this first embodiment.

When FIGS. 11A, 11B are respectively compared to FIGS. 12A, 12B, it is understood that, in the internal combustion engine according to this first embodiment, areas of the patterns for indicating the relatively high flow velocities near the ceiling surface on the exhaust port side are larger than those in the internal combustion engine in which the conventional intake port is adopted. This indicates that, in the internal combustion engine according to this first embodiment, the flow velocity of the intake air that flows into the cylinder from the intake port and is headed in the direction along the ceiling surface on the exhaust port side near the valve center cross section and near the bore center side cross section is higher than that in the internal combustion engine in which the conventional intake port is adopted. In addition, when FIG. 11C is compared to FIG. 12C, it is understood that, in the internal combustion engine according to this first embodiment, a direction in which the patterns for indicating the relatively high flow velocities extend in the upper portion of the cylinder is further closer to the direction along the ceiling surface on the exhaust port side than that in the internal combustion engine in which the conventional intake port is adopted. This indicates that, in the internal combustion engine according to this first embodiment, the intake air flow near the bore wall surface side cross section is closer to the direction along the ceiling surface on the exhaust port side than that in the internal combustion engine in which the conventional intake port is adopted. In other words, in the internal combustion engine according to this first embodiment, the flow velocity of the intake air in the direction along the ceiling surface 8b on the exhaust port side in the upper portion of the cylinder is higher in each of the valve center cross section, the bore center side cross section, and the bore wall surface side cross section than that in the internal combustion engine in which the conventional intake port is adopted.

As a result, as shown in FIG. 13, in the internal combustion engine according to this first embodiment, the flow velocity of the intake air at the point C in the cylinder is also higher in each of the valve center cross section, the bore center side cross section, and the bore wall surface side cross section than that in the internal combustion engine in which the conventional intake port is adopted. In other words, according to the configuration of the intake port according to this first embodiment, the intake air flow that flows into the cylinder from the intake port effectively contributes to generation of the tumble flow in the cylinder. Thus, the tumble flow generated in the cylinder can be intensified.

It should be noted that, as described above, the tumble flow is intensified by guiding the intake air that flows into the cylinder 2 from the intake port 4 in the direction along the ceiling surface 8b on the exhaust port side by the upper wall surface 42 of the intake port 4 in this first embodiment. Accordingly, in this first embodiment, the upper wall surface 42 does not always have to extend substantially straight in a whole region on the upstream side of the upstream side end 41a of the valve connecting surface 41 in the intake port 4, and the cross-sectional shape of the intake port 4 in the direction perpendicular to the axial direction of the intake port 4 does not always have to be the flat shape with the axis in the transverse direction being the long axis. In other words, in a specified region where the intake air that flows into the cylinder 2 can be guided in the direction along the ceiling surface 8b on the exhaust port side by the upper wall surface 42 of the intake port 4 as described above, the upper wall surface 42 only needs to extend substantially straight from the upstream side end 41a of the valve connecting surface 41, and the cross-sectional shape of the intake port 4 in the direction perpendicular to the axial direction of the intake port 4 only needs to be the flat shape with the axis in the transverse direction being the long axis. As such a specified region, a region in the intake port 4 from the upstream side end 41a of the valve connecting surface 41 to the position where the stem guide 13 is provided (a region indicated by a in FIG. 4) can be exemplified. However, the upper wall surface 42 may extend substantially straight to the upstream side of the region α, and the cross-sectional shape of the intake port 4 in the direction perpendicular to the axial direction of the intake port 4 may be the flat shape with the axis in the transverse direction being the long axis.

Figure 14:
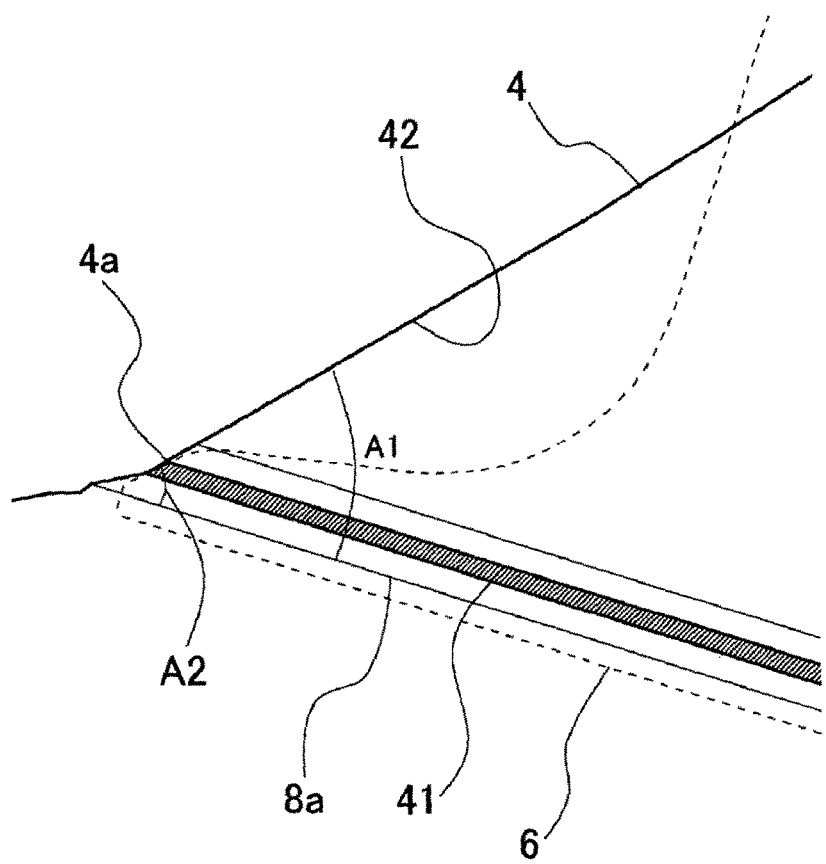
FIG. 14 is one example of a first inclination angle of a straight portion of an upper wall surface of the intake port according to the first embodiment with respect to a ceiling surface on the intake port side and one example of a second inclination angle of a valve connecting surface with respect to the ceiling surface on the intake port side.

In addition, in this first embodiment, as shown in FIG. 14, a first inclination angle A1 of the straight portion in the upper wall surface 42 of the intake port 4 with respect to the ceiling surface 8a on the intake port side may be substantially the same as a second inclination angle A2 of the valve connecting surface 41 with respect to the ceiling surface 8a on the intake port side. In the case where the second inclination angle A2 of the valve connecting surface 41 differs from the first inclination angle A1 of the straight portion in the upper wall surface 42 of the intake port 4, the direction of the intake air flow in the intake port 4 that has flown along the straight portion of the upper wall surface 42 of the intake port 4 is influenced by the valve connecting surface 41 immediately before the intake air flows into the cylinder 2. On the other hand, in the case where both of the inclination angles (the first inclination angle and the second inclination angle) are substantially the same, the intake air in the intake port 4 that has flown along the straight portion of the upper wall surface 42 of the intake port 4 is guided in the same direction by the valve connecting surface 41 also immediately before flowing into the cylinder 2. Accordingly, the intake air that has flown into the cylinder 2 from the intake port 4 is more likely to smoothly flow in the direction along the ceiling surface 8b on the exhaust port side.

Figure 15:
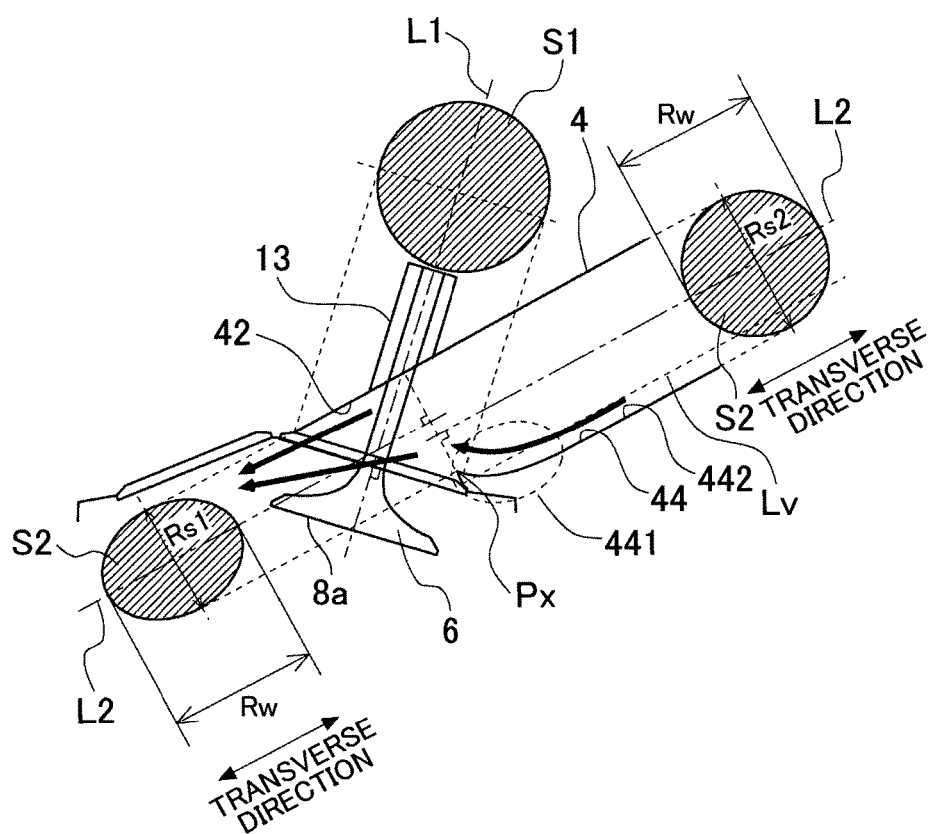
FIG. 15 is a first view of a schematic configuration of an intake port according to a second embodiment.

Next, a description will be made on a second embodiment of the invention. FIG. 15 is a view of a schematic configuration of an intake port of an internal combustion engine according to this second embodiment. Although the intake port according to this second embodiment is a straight port like that in the first embodiment, a shape of a lower wall surface thereof differs from that in the first embodiment. It should be noted that arrows indicate the intake air flow in FIG. 15. In addition, in FIG. 15, the shaded section S1 indicates the cross-sectional shape of the valve connecting surface 41 of the intake port 4, and a shaded section S2 indicates the cross-sectional shape in the direction perpendicular to the axial direction of the intake port 4.

Also, in this second embodiment, the shape of the opening of the intake port 4 is the same as the shape of the opening in the first embodiment shown in FIGS. 3A, 3B, and the valve connecting surface 41 is formed in the opening. In addition, similar to the first embodiment, the upper wall surface 42 of the intake port 4 continues from the upstream side end of the valve connecting surface 41, and is inclined downward from the normal line direction of the ceiling surface 8a on the intake port side while extending substantially straight. Furthermore, the cross-sectional shape of the intake port 4 in the direction perpendicular to the axial direction of the intake port 4 (in detail, the cross-sectional shape on the upstream side from the portion in which the lower wall surface 43 rises) is the oval shape with the axis in the transverse direction being the long axis. Due to these configurations, according to the intake port according to this second embodiment, the same effects as those in the first embodiment can be obtained.

In this second embodiment, a gradient section 441 is formed in a lower wall surface 44 near the stem guide 13 in the intake port 4. In a portion formed with this gradient section 441, the oval shape of the cross section of the intake port 4 in the direction perpendicular to the axial direction of the intake port 4 is changed such that, while a length Rw of the long axis is maintained, a ratio of a length Rs of a short axis (a distance between the upper wall surface 42 and the lower wall surface 44 in the direction perpendicular to the axial direction of the intake port 4) to the length Rw of the long axis is gradually decreased toward the downstream side of the flow of the gas (Rs2>Rs1). Meanwhile, the upper wall surface 42, which faces the gradient section 441, is maintained to be substantially straight. In other words, in the gradient section 441, the lower wall surface 44 is formed to approach the upper wall surface 42 toward the downstream side of the flow of the gas.

Figure 16:
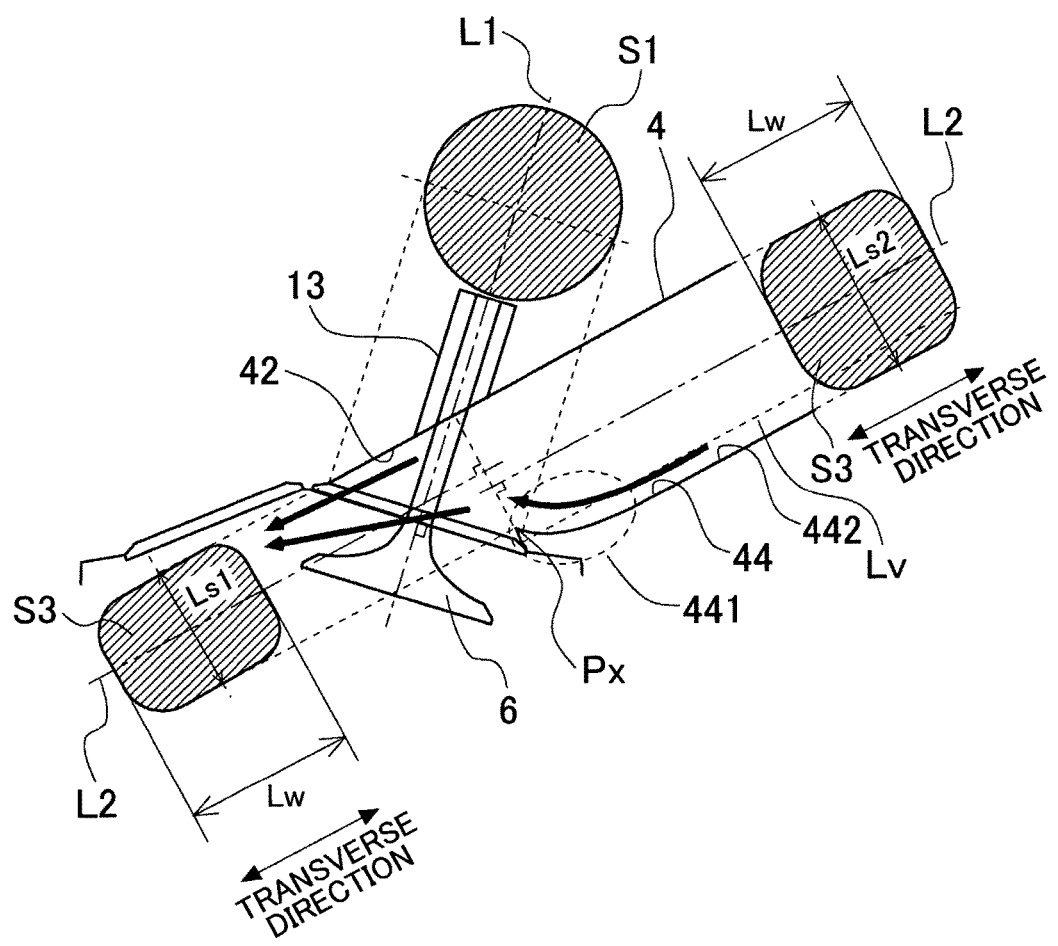
FIG. 16 is a second view of the schematic configuration of the intake port according to the second embodiment.

It should be noted that, also in this second embodiment, the cross-sectional shape in the axial direction of the intake port 4 does not always have to be the oval shape but only needs to be the flat shape with the axis in the transverse direction being the long axis as in the first embodiment. For example, as shown in FIG. 16, the shape of the cross section in the portion of the intake port 4 may be the substantially rectangular shape with the side in the transverse direction being the long side. It should be noted that, in FIG. 16, the shaded section S1 indicates the cross-sectional shape of the valve connecting surface 41 of the intake port 4, and the shaded section S3 indicates the cross-sectional shape in the direction perpendicular to the axial direction of the intake port 4. In this case, in the portion formed with the gradient section 441, the substantially rectangular shape of the cross section in the intake port 4 is changed such that, while a length Lw of the long side (the long axis) thereof is maintained, a ratio of a length Ls of a short side (the short axis) to the length Lw of the long side is gradually decreased toward the downstream side of the flow of the gas (Ls2>Ls1).

In addition, in this second embodiment, as shown in FIG. 15, a position Px, which rises from the upstream side end of the valve connecting surface 41, in the lower wall surface 44 of the intake port 4 corresponds to a downstream side end of the gradient section 441. In other words, the distance between the upper wall surface 42 and the lower wall surface 44 in the direction perpendicular to the axial direction of the intake port 4 is the shortest at the downstream side end of the gradient section 441. In addition, similar to the upper wall surface 42, an upstream side lower wall surface 442 that is a lower wall surface continuous from the gradient section 441 and extending upstream is inclined downward from the normal line direction of the ceiling surface 8a on the intake port side while extending substantially straight. Then, when a surface that is defined in the case where the lower wall surface 44 is assumed to extend substantially straight from the upstream side end of the valve connecting surface 41 in a substantially parallel manner to the upper wall surface 42 is set as a virtual lower wall surface Lv, this upstream side lower wall surface 442 is located below this virtual lower wall surface Lv.

Next, an effect of the configuration of the intake port according to this second embodiment will be described. When the gradient section 441 as described above is formed in the lower wall surface 44 of the intake port 4, the intake air in the intake port 4 that flows near the lower wall surface 44 is guided in a direction toward the upper wall surface 42. Accordingly, when the intake air has flown into the cylinder 2 from the intake port 4, the intake air is less likely to flow in a direction toward the bore wall surface on the intake port 4 side. In other words, when the intake air has flown into the cylinder 2 from the intake port 4, the intake air is more likely to flow in the direction along the ceiling surface 8b on the exhaust port side. In addition, in the portion of the lower wall surface 44 that is formed with the gradient section 441, a cross sectional area of the intake port 4 is gradually decreased toward the downstream side of the flow of the gas. As a result, the flow velocity of the intake air that flows into the cylinder 2 from the intake port 4 is increased. Thus, according to the above configuration, the tumble flow generated in the cylinder 2 can further be intensified.

Figure 17:
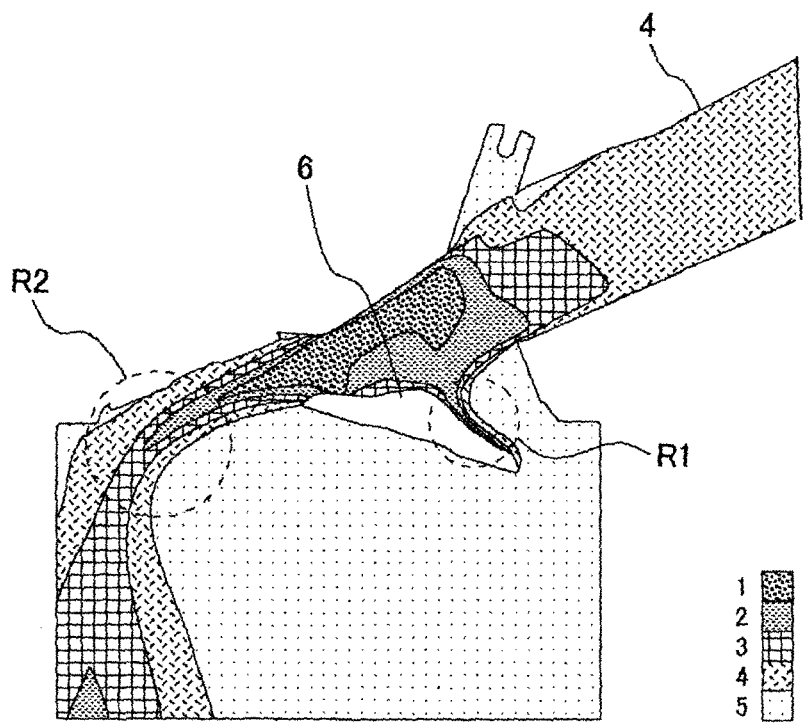
FIG. 17 is a view of the distributions of the flow velocity of the intake air in the internal combustion engine according to the first embodiment when the intake air has flown into the cylinder from the intake port.

FIG. 17 is a view of the distributions of the flow velocity of the intake air in the internal combustion engine according to the first embodiment when the intake air has flown into the cylinder from the intake port. FIG. 18 is a view of the distributions of the flow velocity of the intake air in the internal combustion engine according to the second embodiment when the intake air has flown into the cylinder from the intake port. It should be noted that FIGS. 17 and 18 show the distributions of the flow velocity of the intake air when the operation state of the internal combustion engine 1 is the same. FIGS. 17 and 18 each show the distributions of the flow velocity of the intake air in the bore wall surface side cross section (a cross section at an equivalent position as the Z-Z cross section shown in the upper areas of FIG. 11C and FIG. 12C). In addition, in FIGS. 17 and 18, the distributions of the flow velocity of the intake air are represented by the patterns 1 to 5, and the flow velocity of the intake air decreases in the order from the pattern 1 to the pattern 5 (that is, the flow velocity of the intake air is the highest at a position indicated by the pattern 1, and the flow velocity of the intake air is the lowest at a position indicated by the pattern 5).

When FIG. 17 is compared to FIG. 18, it is understood that, in the internal combustion engine according to this second embodiment, areas of the patterns for indicating the relatively high flow velocities in a region R1 where the intake air that has flown into the cylinder from the intake port flows in the direction along the bore wall surface on the intake port side are smaller than those in the internal combustion engine according to the first embodiment. This indicates that, in the internal combustion engine according to this second embodiment, the flow velocity of the intake air that flows in the direction along the bore wall surface on the intake port side is lower than that in the internal combustion engine according to the first embodiment. In addition, it is also understood that, in the internal combustion engine according to this second embodiment, a direction in which the patterns for indicating the relatively high flow velocities extend in a region R2 in the upper portion of the cylinder on the exhaust port side is further closer to the direction along the ceiling surface on the exhaust port side than that in the internal combustion engine according to the first embodiment. This indicates that, in the internal combustion engine according to this second embodiment, the intake air flow is further closer to the direction along the ceiling surface on the exhaust port side than that in the internal combustion engine according to the first embodiment. In other words, according to the configuration of the intake port according to this second embodiment, the intake air flow that flows into the cylinder from the intake port effectively contributes to the generation of the tumble flow in the cylinder. Thus, the tumble flow generated in the cylinder can further be intensified.

Here, in the case where the gradient section 441 as described above is formed in the lower wall surface 44 of the intake port 4, the cross sectional area of the intake port 4 is decreased in the portion formed with the gradient section 441. Thus, compared to a case where the gradient section 441 is not formed as in the first embodiment, the flow amount of the intake air that flows into the cylinder 2 is possibly decreased. However, in this second embodiment, the upstream side lower wall surface 442 is located below the virtual lower wall surface Lv as described above. According to this configuration, compared to the case where the upstream side lower wall surface 442 is located at the same position as the virtual lower wall surface Lv or located above the virtual lower wall surface Lv, the cross sectional area of the intake port 4 in the portion formed with the gradient section 441 can further be increased. Thus, in the internal combustion engine according to this second embodiment, even when the gradient section 441 is formed in the lower wall surface 44 of the intake port 4, the flow amount of the intake air that flows into the cylinder 2 can easily and sufficiently be secured in comparison with the internal combustion engine according to this first embodiment.

However, even in the case where the upstream side lower wall surface 442 is located at the same position as the virtual lower wall surface Lv or located above the virtual lower wall surface Lv, the effect of intensification of the tumble flow, which is obtained by forming the gradient section 441, can be obtained. In other words, the configuration in which the upstream side lower wall surface 442 is located below the virtual lower wall surface Lv is not essential for the intensification of the tumble flow.

Also, in this second embodiment, similar to the first embodiment, in the whole region on the upstream side of the upstream side end 41a of the valve connecting surface 41 in the intake port 4, the upper wall surface 42 does not always have to extend substantially straight, and the cross-sectional shape of the intake port 4 in the direction perpendicular to the axial direction of the intake port 4 does not always have to be the flat shape with the axis in the transverse direction being the long axis. However, in the intake port 4, the upper wall surface 42 has to extend substantially straight at least from the upstream side end 41a of the valve connecting surface 41 to the position at which the upper wall surface 42 faces the gradient section 441 formed in the lower wall surface 44.

In addition, also in this second embodiment, similar to the first embodiment, the first inclination angle A1 of the straight portion in the upper wall surface 42 of the intake port 4 with respect to the ceiling surface 8a on the intake port side and the second inclination angle A2 of the valve connecting surface 41 with respect to the ceiling surface 8a on the intake port side may substantially be the same.

What is claimed is:

1. An internal combustion engine comprising:
a cylinder;
a piston configured to reciprocate in the cylinder;
an intake valve configured to introduce or block gas from an intake port of the internal combustion engine into a combustion chamber provided in the cylinder; and
an exhaust valve configured to discharge or trap the gas in the combustion chamber from the inside of the combustion chamber to an exhaust port of the internal combustion engine, wherein
in the combustion chamber, a ceiling surface on the intake port side, to which the intake port is opened, and a ceiling surface on the exhaust port side, to which the exhaust port is opened, are each inclined with respect to a plane that is perpendicular to a center axis of the cylinder,
the internal combustion engine is configured to generate a tumble flow by a flow of the gas in the cylinder in a direction from the ceiling surface on the exhaust port side toward a top surface of the piston near a bore wall surface provided in the cylinder on the exhaust port side and by a flow of the gas in a direction from the top surface of the piston toward the ceiling surface on the intake port side near the bore wall surface on the intake port side,
in a specified region that is upstream of a valve connecting surface in the intake port, an upper wall surface of the intake port is inclined with respect to a line that extends in a direction perpendicular to the ceiling surface on the intake port side towards the ceiling surface on the intake port side, the line extending through a center of a stem of the intake valve, continues from an upstream side end of the valve connecting surface, and extends substantially straight, the valve connecting surface being a surface in which an umbrella of the intake valve abuts on an opening of the intake port to the combustion chamber when the intake valve is closed, a cross-sectional shape of the intake port at the specified region in a direction perpendicular to an axial direction of the intake port is a flat shape with a long axis in a transverse direction, the transversal direction being defined as a direction that is perpendicular to the axial direction of said intake port, a laser clad valve seat provided with the opening of the intake port to the combustion chamber, the valve connecting surface being formed on the laser clad valve seat, a first inclination angle of the upper wall surface with respect to the ceiling surface on the intake port side and a second inclination angle of the valve connecting surface with respect to the ceiling surface on the intake port side are substantially the same, and the upper wall surface continues from the upstream side end of the valve connecting surface and extends substantially straight in the specified region in the intake port, and an intake air in the intake port that has flown along the straight portion of the upper wall surface of the intake port is guided in the same direction by the valve connecting surface even when passing through the valve connecting surface, wherein the umbrella of the intake valve is in contact with the opening of the intake port to the combustion chamber when the intake valve is closed throughout the valve connecting surface.

2. The internal combustion engine according to claim 1, wherein a lower wall surface that faces the upper wall surface extending substantially straight in the specified region of the intake port is provided with a gradient section, and in the gradient section a distance between the lower wall surface and the upper wall surface in a downstream side of flow of the gas is smaller than a distance between the lower wall surface and the upper wall surface in an upstream side of the flow of the gas such that, in a state that a length of a long axis of the cross section in the direction that is perpendicular to the axial direction of the intake port is maintained, a ratio of a length of a short axis to the length of the long axis in the cross section in the downstream side of the flow of the gas is smaller than a ratio of the length of the short axis to the length of the long axis in the cross section in the up steam side of the flow of the gas.

3. The internal combustion engine according to claim 2, wherein a upstream side lower wall surface is located below a virtual lower wall surface, the upstream side lower wall surface is a portion of the lower wall surface in the intake port and extends upstream continuously from the gradient section, and the virtual lower wall surface is a lower wall surface in a case where the lower wall surface is assumed to extend substantially straight from the upstream side end of the valve connecting surface and substantially parallel to the upper wall surface.

4. The internal combustion engine according to claim 1, wherein the specified region of the intake port is a region from the upstream side end of the valve connecting surface to a position at which a stem guide of the intake valve is provided.

\* \* \* \* \*